T. A. Shock.
Lubricator & Water-Conductor.
Nº 73262.  Patented Jan. 14, 1868.
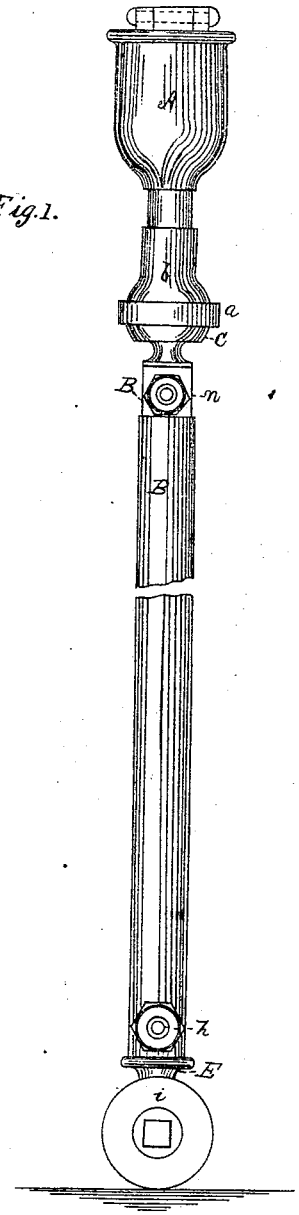
Fig. 1.
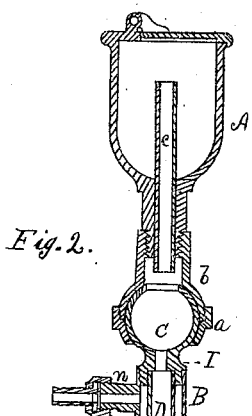
Fig. 2.
Fig. 3.
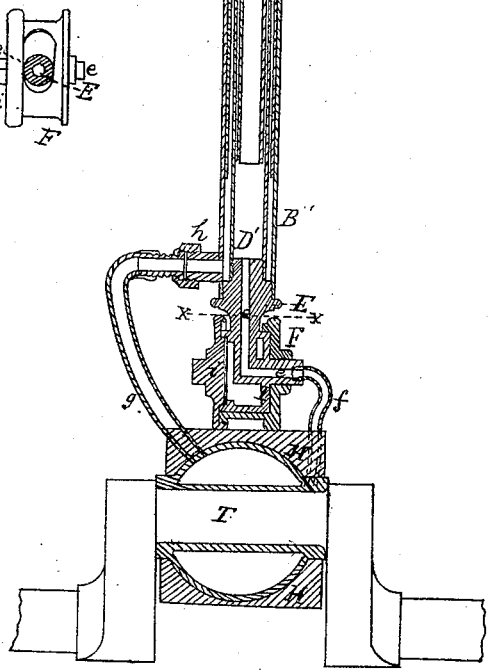
Witnesses.
Inventor.
Thos A Shock
by Dodge & Munn
Attys

United States Patent Office.

THOMAS A. SHOCK, U. S. N., OF BOSTON, MASSACHUSETTS.

Letters Patent No. 73,262, dated January 14, 1868.

COMBINED LUBRICATOR AND WATER-CONDUCTOR.

*The Schedule referred to in these Letters Patent and making part of the same.*

TO ALL WHOM IT MAY CONCERN:

Be it known that I, THOMAS A. SHOCK, Chief Engineer, United States Navy, of Boston, in the county of Suffolk, and State of Massachusetts, have invented certain new and useful Improvements in Combined Lubricator and Water-Conductor; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in so constructing a device that it may be attached to a crank or other bearing of machinery, and serve to convey oil to the bearings, and at the same time also convey water to the brasses or boxes for keeping them cool, and prevent heating.

Figure 1 is a side elevation,

Figure 2 a longitudinal section, and

Figure 3 is a transverse section, taken on the line $x$–$x$ of fig. 2.

In heavy machinery there is always a liability of the bearings becoming heated, and thereby injured; and this liability is especially great in the cranks and other bearings of the machinery used in steam-vessels. In order to prevent this difficulty various devices have been used to keep the bearings lubricated; and water has also been applied, by means of a pipe or hose, to keep the brasses or boxes cool. When it is attempted to apply water by means of a hose, held in the hand, to a crank-bearing, it will at once be seen that such attempt is attended with difficulties, as it is impossible to keep time with the movements of the crank, especially when the latter moves with rapidity, and the consequence is that the water is not supplied with regularity and constancy to the bearings, but is thrown and scattered about where it is not wanted.

To remedy this difficulty is the object of my invention, and to accomplish it I construct a device, as represented in the drawings, and which consists of two concentric tubes, B and D, secured to a hub, L, at their upper end, and two similar concentric tubes, B′ and D′, secured to another hub, E, at their lower ends, as shown in fig. 2, the tubes B D being fitted to slide, water-tight, within the corresponding tubes B′ D′. An oil-cup, A, is secured to the hub L, by means of a ball-and-socket joint, as shown in fig. 2, in which C represents the ball, formed on the upper end of the hub L, and the cap $b$, with the ring $a$, when screwed together, forming the socket. The ball C is hollow, and an opening extends from it down through the centre of the hub L into the tube D. At the lower end of the tube D′, an opening, $e$, extends down into the hub E, and turning at a right angle, extends out through one side, as represented, thus forming a continuous duct or channel for the passage of the oil from the cup A. The lower portion of the hub E is formed into a horizontal journal, I, and enclosed in a box, F, which has a cap, $i$, screwed on at the opposite side, as shown in fig. 2, there being an oblong opening formed in the edge of the box F, where the hub E enters, as represented in fig. 3, to permit the tubes to have an oscillating motion, independent of the movements of box F. Near the upper end of the tube B, a short pipe or nozzle, $n$, is secured, and opening into the space between the tubes B D, there being a similar tube or nozzle, $h$, attached near the bottom of tube B′. To the upper nozzle $n$, a flexible tube or pipe is secured, through which water may be conveyed from an elevated reservoir, or forced by a pump, into and through the space between the inner and outer tubes, from whence it will flow, in a continuous stream, out through the pipe $h$, and may be conveyed by means of a pipe, $g$, into the hollow of the brasses H, as represented in fig. 2, or in case of smaller bearings, in which there are no hollows, the water may be delivered upon the outside of the bearings, or boxes and journals, or cranks. It will thus be seen that two channels or conduits are provided in the same device, the inner one leading from the oil-cup A, and conveying the oil to the journal T, while the other or outer channel conveys water to the brasses or bearings.

In using my invention, the oil-cup is secured stationary, in an upright position, by any suitable means, and the lower end or box F is fastened to the crank, so as to move with it, the sliding of the tubes permitting the lower part to move with the crank, while the oil-cup remains stationary. By this device I am enabled to keep the crank or journal constantly lubricated, and at the same time keep a constant stream of cold water applied to the brasses or bearings.

Having thus described my invention, what I claim, is—

The combined lubricator and water-conductor, constructed substantially as and for the purpose described.

THOS. A. SHOCK.

Witnesses:
  C. W. PENNINGTON,
  W. H. HARRIS.